United States Patent [19]

Dunnavant et al.

[11] Patent Number: 5,338,774
[45] Date of Patent: Aug. 16, 1994

[54] POLYURETHANE-FORMING BINDER SYSTEMS CONTAINING A POLYPHOSPHORYL CHLORIDE

[75] Inventors: William R. Dunnavant, Columbus; Robert B. Fechter, Worthington, both of Ohio

[73] Assignee: Ashland Oil, Inc., Columbus, Ohio

[21] Appl. No.: 913,577

[22] Filed: Jul. 15, 1992

[51] Int. Cl.$^5$ .................. C08K 5/51; C08G 18/08; C08G 18/54; B22C 9/02
[52] U.S. Cl. .................. 523/143; 523/141; 523/142; 524/121; 524/136; 524/149
[58] Field of Search .................. 523/143, 142, 141; 524/121

[56] References Cited

U.S. PATENT DOCUMENTS

| | | | |
|---|---|---|---|
| 4,436,881 | 3/1984 | Laitar | 524/115 |
| 4,540,724 | 9/1985 | Dunnavant et al. | 523/143 |
| 4,602,069 | 7/1986 | Dunnavant et al. | 523/143 |
| 4,683,252 | 7/1987 | Dunnavant et al. | 523/143 |

FOREIGN PATENT DOCUMENTS 8803541  5/1988  PCT Int'l Appl. .................. 523/143

*Primary Examiner*—Paul R. Michl
*Assistant Examiner*—Olga Asinovsky
*Attorney, Agent, or Firm*—David L. Hedden

[57] ABSTRACT

Polyphosphoryl chlorides are used in polyurethane-forming foundry binder systems to extend the bench life of foundry mixes prepared by mixing the binder systems with sand. The foundry mixes are particularly useful for preparing molds and cores used for making metal castings.

9 Claims, No Drawings

POLYURETHANE-FORMING BINDER SYSTEMS CONTAINING A POLYPHOSPHORYL CHLORIDE

TECHNICAL FIELD

This invention relates to polyurethane-forming foundry binder systems which are used to prepare foundry mixes, and foundry shapes made from foundry mixes by the cold-box process. The polyurethane-forming binder systems contain a polyphosphoryl chloride which improves the bench life of the foundry mix. The foundry mix can be used to make acceptable foundry shapes even if one waits for an extended time before using the foundry mix after it is formed.

BACKGROUND OF THE INVENTION

In the foundry industry, one of the processes used for making metal parts is sand casting. In sand casting, disposable foundry shapes (usually characterized as molds and cores) are made by shaping and curing a foundry mix which is a mixture of sand and an organic or inorganic binder. The binder is used to strengthen the molds and cores.

One of the processes used in sand casting for making molds and cores is the cold-box process. In this process a gaseous curing agent is passed through a compacted shaped mix to produce a cured mold and/or core.

A binder commonly used in the cold-box process is a polyurethane binder derived by curing a polyurethane-forming binder system with a gaseous tertiary amine catalyst. The polyurethane-forming binder system usually consists of a phenolic resin component and polyisocyanate component which are mixed with sand prior to compacting and curing to form a foundry mix.

When the two components of the binder system are mixed with the sand to form a foundry mix, they may prematurely react prior to curing with the gaseous catalyst. If this reaction occurs, it will reduce the flowability of the foundry mix when it is used for making molds and cores, and the resulting molds and cores will have reduced strengths.

The bench life of the foundry mix is the time interval between forming the foundry mix and the time when the foundry mix is no longer useful for making acceptable molds and cores. A measure of the usefulness of the foundry mix and the acceptability of the molds and cores prepared with the foundry mix is the tensile strength of the molds and cores. If a foundry mix is used after the bench life has expired, the resulting molds and cores will have unacceptable tensile strengths.

Because it is not always possible to use the foundry mix immediately after mixing, it is desirable to prepare foundry mixes with an extended bench life. Many patents have described compounds which improve the bench life of the foundry mix. Among the compounds useful to extend the bench life of the foundry mix are organic and/or inorganic phosphorus containing compounds.

Examples of organic phosphorus-containing compounds used as benchlife extenders with polyurethane-forming binder systems are disclosed in U.S. Pat. No. 4,436,881 which discloses certain organic phosphorus containing compounds such as dichloroarylphosphine, chlorodiarylphosphine, arylphosphinic dichloride, or diarylphosphinyl chloride, and U.S. Pat. No. 4,683,252 which discloses organohalophosphates such as monophenyldichlorophosphate Examples of inorganic phosphorus-containing compounds which extend the bench life of polyurethane-forming binder systems are disclosed in U.S. Pat. No. 4,540,724 which discloses inorganic phosphorus halides such as phosphorus oxychloride, phosphorus trichloride, and phosphorus pentachloride, and U.S. Pat. No. 4,602,069 which discloses inorganic phosphorus acids such as orthophosphoric acid, phosphoric acid, hypophosphoric acid, metaphosphoric acid, pyrophosphoric acid, and polyphosphoric acid.

In order for a compound to be effective as a bench life extender, it first must be compatible with the polyisocyanate component of the urethane forming binder and mix well with sand. Furthermore, in addition to improving the bench life of foundry mixes made with sand having a range of temperatures normally found in foundry environments, such compounds should have low volatility to minimize inhalation by workers in the foundry. Additionally, such compounds should not create unacceptable stress to the environment.

SUMMARY OF THE INVENTION

This invention relates to cold-box polyurethane-forming foundry binder systems curable with a catalytically effective amount of a gaseous amine catalyst comprising as separate components:
(A) a pheholic resin component;
(B) a polyisocyanate component comprising:
   (1) an organic polyisocyanate; and
   (2) an effective bench life extending amount of a polyphosphoryl chloride.

This invention also relates to a foundry mix comprising a mixture of components A and B and an aggregate. The foundry mix is shaped into molds and cores which are then cured with a gaseous tertiary amine. The cured molds and cores are used to cast ferrous and non ferrous metal parts. There are several advantages to using polyphosphoryl chlorides to extend the bench life of the foundry mix. Not only do polyphosphoryl chlorides have the predicted advantages with respect to extending the benchlife of the foundry mix when cold sand is used to prepare the foundry mix, but these compounds exhibit surprising utility for extending the bench life of the foundry mix when hot sand is used to prepare the foundry mix. (For purposes of this disclosure, hot sand is sand which has a temperature exceeding 30° C., typically exceeding 38° C., and more typically exceeding 50° C.) As will be shown later, this is in contrast to the effectiveness of phosphorus oxychloride, widely used as a bench life extender in polyurethane-forming binder systems in foundries in Europe, which is believed to be the closest prior art compound. The data will show that phosphorus oxychloride is very effective on cold sand, but much less effective than a polyphosphoryl chloride on hot sand.

This discovery is particularly significant since most sand used in foundries exceeds these temperatures either because the ambient temperature is so high, or because reclaimed sand is used which is heated in the reclaiming process. Thus polyphosphoryl chlorides are multipurpose benchlife extenders since they extend the bench life of both cold and hot sand mixes.

There are other advantages to using a polyphosphoryl chloride in the sand mix to extend bench life. Such compounds have boiling points greater than 210° C. at atmospheric pressure as compared to 105° C. for phosphorus oxychloride. Consequently, they are less volatile, their odors are less detectable, and workers are not subject to the same degree of exposure as with phosphorus oxychloride.

BEST MODE AND OTHER MODES OF PRACTICING THE INVENTION

The novel aspect of the polyurethane-forming binder system relates to the use of polyphosphoryl chlorides as bench life extenders in polyurethane-forming binder system. Polyphosphoryl chlorides which can be used as bench life extenders in the polyurethane-forming binder include pyrophosphoryl chloride and higher molecular weight polyphosphoryl chlorides and are generally represented by either of the following structural formulae:

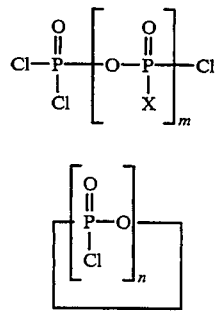

(I)

(II)

where m is at least 1, X is Cl or

and n is at least 2.

Structure I represents linear or branched polyphosphoryl chlorides while structure II represents cyclic polyphosphoryl chlorides. When m is 1 and x is Cl in structure I, the polyphosphoryl chloride is pyrophosphoryl chloride. Mixtures of linear, branched, and cyclic polyphosphoryl chlorides can be used. The important consideration is that the polyphosphoryl chlorides chosen are compatible with the polyisocyanate component. Generally preferred as the polyphosphoryl chloride is pyrophosphoryl chloride, or mixtures of pyrophosphoryl chloride and other polyphosphoryl chlorides.

Methods for preparing pyrophosphoryl chloride, polyphosphoryl chlorides, and mixtures thereof are known. See for example J. W. Mellor, *A Comprehensive Treatise on Inorganic and Theoretical Chemistry*, Vol. VIII, Longmans, London, 1953, pp. 1026–1028; ibid., Suppl. III to Vol. VIII, 1971, pp. 504–508. Articles of interest within this treatise include A. Guenthr and A. Michaelis, *Jena. Zeit.*, 7(1), 103 (1871) and *Ber.*, 4, 766 (1871); H. Grunze, *Z. Anorg. Allgem. Chem.*, 296, *Angew. Chem.* 69, 640 (1957); E. Fluck, *Angew. Chem.*, 72, 752 (1960); M. Becke-Goehring and E. Fluck, U.S. Pat. No. 3,014,786, 786 (Dec. 26, 1961).

Of particular interest is the method for preparing pyrophosphoryl chloride described by H. Grunze, *Z. Anorg. Allgem. Chem.*, 324(1–2), 1 (1963) and in German Patent 1,164,993 (Mar. 12, 1964).

The polyphosphoryl chloride is preferably added to the polyisocyanate component of the binder, and is used in an amount effective to extend the bench life of the sand mix formed by mixing the polyurethane-forming binder system and sand. Generally, this will be in an amount of 0.01 to 3.0 weight percent, preferably 0.05 to 1.0 weight percent based upon the total weight of the binder, i.e. the phenolic resole resin component and polyisocyanate component. Naturally, greater amounts can be used, but it is not likely that additional improvements in performance will result above 3.0 weight percent.

The phenolic resin component of the binder system comprises a phenolic resin, preferably a polybenzylic ether phenolic resin, and a solvent as specified. It may also contain various optional ingredients such as adhesion promoters and release agents.

The polybenzylic ether phenolic resin is prepared by reacting an excess of aldehyde with a phenol in the presence of either an alkaline catalyst or a divalent metal catalyst according to methods well known in the art. The preferred polybenzylic ether phenolic resins used to form the subject binder compositions are polybenzylic ether phenolic resins which are specifically described in U.S. Pat. No. 3,485,797 which is hereby incorporated by reference into this disclosure.

These polybenzylic ether phenolic resins are the reaction products of an aldehyde with a phenol. They preferably contain a preponderance of bridges joining the phenolic nuclei of the polymer which are ortho-ortho benzylic ether bridges. They are prepared by reacting an aldehyde and a phenol in a mole ratio of aldehyde to phenol of at least 1:1, generally from 1.1:1.0 to 3.0:1.0 and preferably from 1.1:1.0 to 2.0:1.0, in the presence of a metal ion catalyst, preferably a divalent metal ion such as zinc, lead, manganese, copper, tin, magnesium, cobalt, calcium, or barium.

Generally, the phenols used to prepare the phenolic resole resins may be represented by the following structural formula:

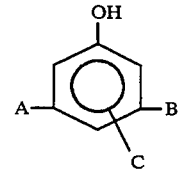

wherein A, B, and C are hydrogen atoms, or hydroxyl radicals, or hydrocarbon radicals or oxyhydrocarbon radicals, or halogen atoms, or combinations of these. However, multiple ring phenols such as bisphenol A may be used.

Specific examples of suitable phenols used to prepare the polybenzylic ether phenolic resins include phenol, o-cresol, p-cresol, p-butylphenol, p-amylphenol, p-octylphenol, and p-nonylphenol.

The aldehydes reacted with the phenol include any of the aldehydes heretofore used to prepare polybenzylic ether phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The polybenzylic ether phenolic resin is preferably non-aqueous. By "non-aqueous" is meant a polybenzylic ether phenolic resin which contains water in amounts of no more than about 10%, preferably no more than about 1% based on the weight of the resin.

The polybenzylic ether phenolic resin used is preferably liquid or soluble in an organic solvent. Solubility in an organic solvent is desirable to achieve uniform distribution of the phenolic resin component on the aggregate. Mixtures of polybenzylic ether phenolic resins can be used.

Alkoxy-modified polybenzylic ether phenolic resins may also be used as the phenolic resin. These polybenzylic ether phenolic resins are prepared in essentially the same way as the unmodified polybenzylic ether phenolic resins previously described except a lower alkyl alcohol, typically methanol, is reacted with the phenol and aldehyde or reacted with an unmodified phenolic resin.

In addition to the polybenzylic ether phenolic resin, the phenolic resin component of the binder composition also contains at least one organic solvent. Preferably the amount of solvent is from 40 to 60 weight percent of total weight of the phenolic resin component. Specific solvents and solvent combinations will be discussed in conjunction with the solvents used in the polyisocyanate component.

The isocyanate component of the binder system acts as a hardener and is a polyisocyanate having a functionality of two or more, preferably 2 to 5. It may be aliphatic, cycloaliphatic, aromatic, or a hybrid polyisocyanate. Mixtures of such polyisocyanates may be used. In some situations, it may be possible to use prepolymers and quasiprepolymers of polyisocyanates. These are formed by reacting excess polyisocyanate with compounds having two or more active hydrogen atoms, as determined by the Zerewitinoff method. Optional ingredients such as release agents may also be used in the isocyanate hardener component.

Representative examples of polyisocyanates which can be used are aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanates are used in sufficient concentrations to cause the curing of the polybenzylic ether phenolic resin when gassed with the amine curing catalyst. In general the isocyanate ratio of the polyisocyanate to the hydroxyl of the polybenzylic ether phenolic resin is from 0.75:1.25 to 1.25:0.75, preferably about 0.9:1.1 to 1.1:0.9.

The polyisocyanate is used in a liquid form. Solid or viscous polyisocyanates must be used in the form of organic solvent solutions, the solvent generally being present in a range of up to 80 percent by weight of the solution.

Those skilled in the art will know how to select specific solvents for the phenolic resin component and polyisocyanate hardener component. The organic solvents which are used with the polybenzylic ether phenolic resin in the polybenzylic ether phenolic resin component are aromatic solvents, esters, ethers, and alcohols, preferably mixtures of these solvents.

It is known that the difference in the polarity between the polyisocyanate and the polybenzylic ether phenolic resins restricts the choice of solvents in which both components are compatible. Such compatibility is necessary to achieve complete reaction and curing of the binder compositions of the present invention. Polar solvents of either the protic or aprotic type are good solvents for the polybenzylic ether phenolic resin, but have limited compatibility with the polyisocyanate.

The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and Texanol. Other polar solvents include liquid dialkyl esters such as dialkyl phthalate of the type disclosed in U.S. Pat. No. 3,905,934 and other dialkyl esters such as dimethyl glutarate.

Aromatic solvents, although compatible with the polyisocyanate, are less compatible with the phenolic resins. It is, therefore, preferred to employ combinations of solvents and particularly combinations of aromatic and polar solvents. Suitable aromatic solvents are benzene, toluene, xylene, ethylbenzene, and mixtures thereof. Preferred aromatic solvents are mixed solvents that have an aromatic content of at least 90% and a boiling point range of 138° C. to 232° C.

Drying oils, for example those disclosed in U.S. Pat. No. 4,268,425, may also be used in the polyisocyanate component. Drying oils may be synthetic or natural occurring and include glycerides of fatty acids which contain two or more double bonds whereby oxygen on exposure to air can be absorbed to give peroxides which catalyze the polymerization of the unsaturated portions.

The binder system is preferably made available as a two-package system with the phenolic resin component in one package and the polyisocyanate component in the other package. Usually, the binder components are combined and then mixed with sand or a similar aggregate to form the foundry mix or the mix can be formed by sequentially mixing the components with the aggregate. Preferably the phenolic resin component is first mixed with the sand before mixing the isocyanate component with the sand. Methods of distributing the binder on the aggregate particles are well-known to those skilled in the art. The mix can, optionally, contain other ingredients such as iron oxide, ground flax fibers, wood cereals, pitch, refractory flours, and the like.

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used is known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, sand, chromite sand, and the like.

In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5% by weight based upon the weight of the aggregate in ordinary sand-type foundry shapes.

Although the aggregate employed is preferably dry, small amounts of moisture, generally up to about 1 weight percent based on the weight of the sand, can be tolerated. This is particularly true if the solvent employed is non-water-miscible or if an excess of the polyisocyanate necessary for curing is employed since such excess polyisocyanate will react with the water.

The foundry mix is molded into the desired shape, whereupon it can be cured. Curing can be affected by passing a tertiary amine through the molded mix such as described in U.S. Pat. No. 3,409,579 which is hereby incorporated into this disclosure by reference.

Another additive which can be added to the binder composition, usually the phenolic resin component, in order to improve humidity resistance is a silane such as those described U.S. Pat. No. 4,540,724 which is hereby incorporated into this disclosure by reference.

EXAMPLES 1-5 AND CONTROLS

The examples which follow will illustrate specific embodiments of the invention. These examples along with the written description will enable one skilled in the art to practice the invention. It is contemplated that many other embodiments of the invention will be operable besides these specifically disclosed.

In all of the examples the test specimens were produced by the cold-box process by contacting the compacted mixes with triethylamine (TEA) for 0.5 second. All parts are by weight and all temperatures are in °C. unless otherwise specified. The following abbreviations are used in the examples:

BLE=benchlife extender
CNTR=control
PPC=pyrophosphoryl chloride
PPCP=pyrophosphoryl chloride plus other polyphosphoryl chlorides
POC=phosphorus oxychloride The same general procedures were used in all the examples. The control experiment did not use a polyphosphoryl chloride as a bench life extender. Instead it used POC which is known to be an effective bench life extender and is widely used in Europe. It is believed that POC is the closest prior art bench life extender for polyurethane-forming binder systems. This example provides a frame of reference from which to evaluate the effectiveness of the polyphosphoryl chloride bench life extenders within the scope of this invention.

In order to carry out control experiment A and Examples 1-3, 100 parts by weight of cold sand (Manley 1L-5W sand at a temperature of 20° C. to 25° C.) were mixed with about 0.825 part of a phenolic resin component for about two minutes. In control Experiment B and Examples 4-5, hot sand (Badger 5574 sand at a temperature of about 49° C.) was used. Then about 0.675 part of the polyisocyanate component was added and mixed for about two additional minutes.

The phenolic resin component used in the examples comprised (a) a polybenzylic ether phenolic resin prepared with zinc acetate dihydrate as the catalyst and modified with the addition of 0.09 mole of methanol per mole of phenol, and (b) a co-solvent mixture comprising a mixture of aromatic solvents and ester solvents such that weight ratio of aromatic solvents (HI-SOL 10 and GETTY 400) to ester solvents (dibasic ester and dioctyl adipate) is 0.9:1.0, wherein the weight ratio of resin to co-solvent mixture in the phenolic resin component is 1.38:1.0. The phenolic resin component also contained a silane (A-187) in the amount of 0.6 part and a release agent (Sylfat 95) in an amount of 1.0 part, said parts based upon the total weight of the resin component.

The polyisocyanate component used in the examples comprised (a) a polymethylene polyphenyl isocyanate (MRS-5 sold by Mobay Corporation), and (b) a mixture of an aliphatic solvent (kerosene) and aromatic solvents (GETTY 400 and HI-SOL 15) in a weight ratio of aliphatic to aromatic solvents of about 1:2.9, such that the weight ratio of polyisocyanate to solvent mixture is about 7.8:2.2. A bench life extender was added to the polyisocyanate component in the amount specified in Table I, where pbw (parts by weight) is based upon the total weight of the phenolic resin component and the polyisocyanate component.

The resulting foundry mixes were compacted into a dogbone shaped core box by blowing and were cured using the cold-box process as described in U.S. Pat. No. 3,409,579. In this instance, the compacted mixes were then contacted with a mixture of TEA in nitrogen at 20 psi for 0.5 second, followed by purging with nitrogen that was at 60 psi for about 6 seconds, thereby forming AFS tensile test specimens (dog bones) using the standard procedure.

Measuring the tensile strength of the dog bone shapes enables one to predict how the mixture of sand and binder will work in actual foundry operations. Lower tensile strengths for the shapes indicate that the phenolic resin and polyisocyanate reacted more extensively after mixing with the sand prior to curing.

In the examples which follow, the sand mixes were cured at zero hours bench time, after 3 hours of bench time, and after 5 hours of bench time at ambient conditions in closed containers, and the tensile strengths were measured immediately and 24 hours after curing. The results are given in Table I.

TABLE I

| (TENSILE STRENGTHS OF FOUNDRY SHAPES MADE WITH FOUNDRY BINDERS) | | | | | | | |
|---|---|---|---|---|---|---|---|
| BINDER COMPOSITION | | | TENSILE STRENGTH | | | | |
| | | AMOUNT | 0 HR BENCH | | 3 HR. BENCH | | 5 HR. BENCH | |
| EXAMPLE | BLE | (PBW) | Imm. | 24 Hr. | Imm. | 24 Hr. | Imm. | 24 Hr. |
| CNTR A* | POC | 0.27 | 108 | 171 | 87 | 147 | 75 | 114 |
| 1* | PPC | 0.27 | 107 | 189 | 91 | 157 | 84 | 126 |
| 2* | PPCP | 0.27 | 110 | 175 | 90 | 156 | 82 | 131 |
| 3* | PPC | 0.16 | 112 | 167 | 89 | 141 | 79 | 120 |
| CNTR B** | POC | 0.27 | 217 | 307 | 15 | 28 | N/A | N/A |
| 4** | PPC | 0.27 | 223 | 326 | 113 | 178 | 65 | 105 |
| 5** | PPCP | 0.27 | 209 | 332 | 137 | 211 | 92 | 145 |

*Indicates that the experiment was performed on cold sand (Manley 1L-5W and at a temperature of 20° C. to 25° C.).
**Indicates that the experiment was performed on hot sand (Badger sand 5574 at a temperature of about 49° C.).
N/A means that cores could not be made because the foundry mix was hard and not flowable.

The data in Table I suggest that POC (Control A and B), PPC, and PPCP all are effective bench life extenders for foundry mixes prepared with cold sand. On the other hand, the data also suggest that PPC and PPCP provide much improved benchlife extending properties for foundry mixes prepared on hot sand than POC. See the tensile strengths for control B and Examples 4–5 after a bench life of three and five hours (shaded portion of Table I). Note that cores could not even be made with the foundry mix of control B after a benchlife of 5 hours because it was hard and not flowable.

This discovery is particularly significant since most sand used in foundries frequently exceeds temperatures of 20° C. to 25° C. either because the ambient temperature is so high, or because hot reclaimed sand. Thus polyphosphoryl chlorides are multipurpose benchlife extenders since they extend the bench life of both cold and hot sand mixes.

Furthermore, because they have higher boiling points than POC, they are less volatile, their odor is less detectable, and workers are not subject to the same degree of exposure as with POC.

We claim:

1. A foundry mix comprising:
   (A) a major amount of hot aggregate; and
   (B) an effective bonding amount of a binder system comprising as separate components:
      (1) a phenolic resin component;
      (2) a polyisocyanate component comprising:
         (a) an organic polyisocyanate; and
         (b) an effective bench life extending amount of a polyphosphoryl chloride.

2. The foundry mix of claim 1 wherein the binder composition is about 0.6 to 5.0 weight percent based upon the weight of the aggregate.

3. The foundry mix claim 2 wherein the polyphosphoryl chloride is selected from the group consisting of pyrophosphoryl chloride, higher molecular weight polyphosphoryl chlorides, and mixtures thereof.

4. The foundry mix of claim 3 wherein the polyphosphoryl chloride is soluble in the isocyanate component.

5. The foundry mix of claim 3 wherein the phenolic resin component comprises a (a) a polybenzylic ether phenolic resin prepared by reacting an aldehyde with a phenol such that the molar ratio of aldehyde to phenol is from 1.1:1 to 3:1 in the presence of a divalent metal catalyst, and (b) a solvent in which the resole resin is soluble.

6. The foundry mix of claim 5 wherein the phenol is selected from the group consisting of phenol, o-cresol, p-cresol, and mixtures thereof.

7. The foundry mix of claim 6 wherein the aldehyde is formaldehyde.

8. The foundry mix of claim 7 wherein the polyphosphoryl chloride is used in an amount of 0.01 to 3.0 weight percent based upon the weight of the total weight of components A and B.

9. The foundry mix of claim 8 wherein the ratio of hydroxyl groups of the polybenzylic ether phenolic resin to the isocyanate groups of the polyisocyanate hardener is from 0.90:1.1 to 1.1:0.90.

* * * * *